Dec. 19, 1950 C. H. GILLIG 2,534,348
AUTOMOBILE WINDOW AIR DEFLECTOR

Filed Aug. 11, 1947 2 Sheets-Sheet 1

INVENTOR.
CHESTER H GILLIG
BY
Charles M Fryer
ATTORNEY

Dec. 19, 1950     C. H. GILLIG     2,534,348
AUTOMOBILE WINDOW AIR DEFLECTOR
Filed Aug. 11, 1947     2 Sheets-Sheet 2
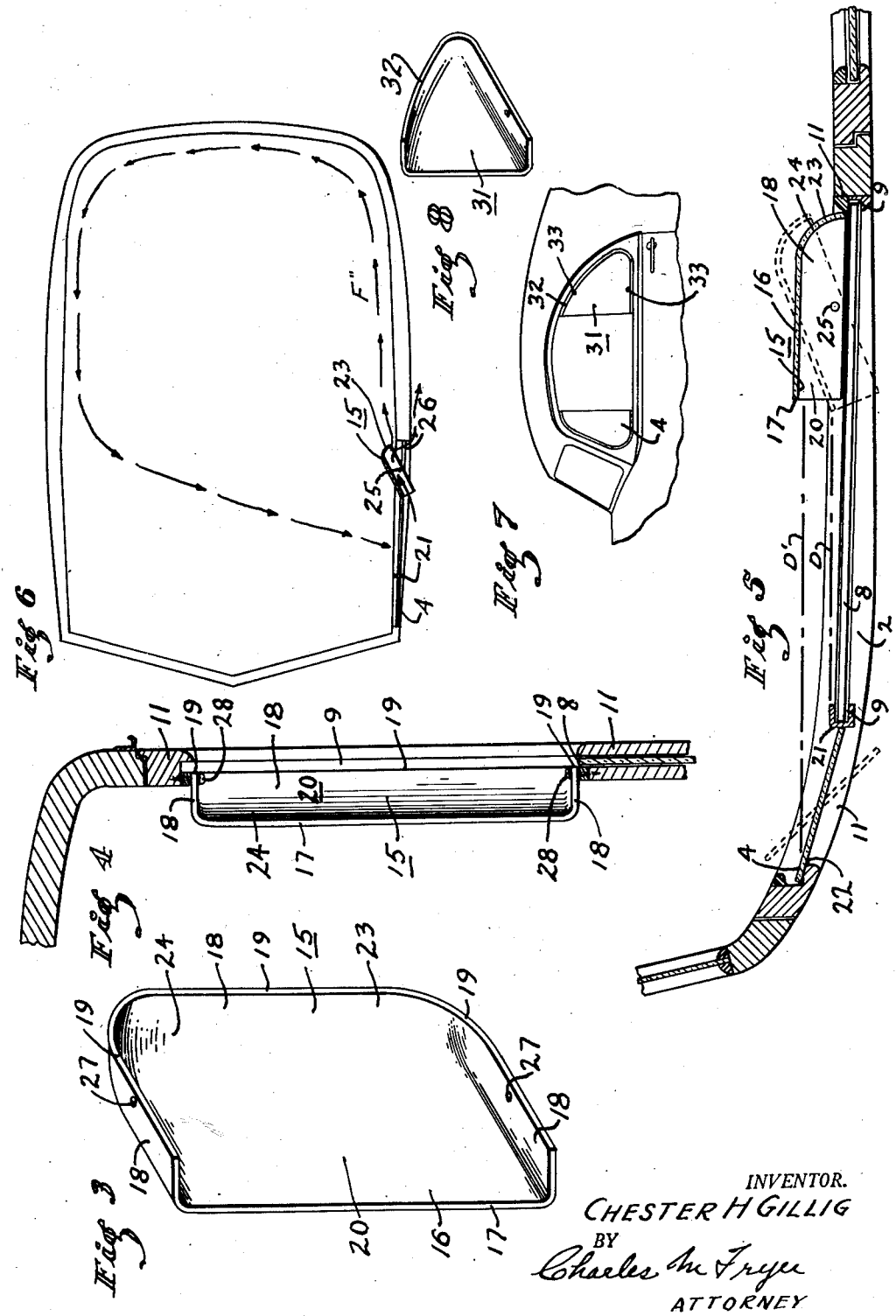
INVENTOR.
CHESTER H GILLIG
BY
Charles M Fryer
ATTORNEY Patented Dec. 19, 1950

2,534,348

UNITED STATES PATENT OFFICE 2,534,348

AUTOMOBILE WINDOW AIR DEFLECTOR

Chester H. Gillig, Oakland, Calif.

Application August 11, 1947, Serial No. 768,023

4 Claims. (Cl. 296—44)

My invention relates to an air deflector for an automobile window, and more particularly to a combined draft shield and ventilator especially adapted for mounting over the inside rear portion of the automobile window at the side of the operator for the vehicle.

The customary automobile body of the closed type contains slidable window panes which are mounted for up and down movement to allow for opening or closing of the window. In the case of the window directly adjacent the operator's station of the vehicle (hereinafter designated as operator's window), it is customery for the operator to have this window wide open during driving of the vehicle, so that he may give the necessary arm signals. Although there is usually a pivoted planar, draft panel at the front of this slidable window, it does not efficaciously serve its intended function when such operator's window is open. Consequently, as the vehicle is driven forward, air currents will enter the vehicle through the operator's open window causing drafts not only on the operator but on other occupants of the vehicle, particularly those who may be sitting on a rear seat. These drafts are quite objectionable.

My invention is designed to overcome this problem. It, therefore, has as its objects, among others, the provision of an improved air deflector mounted at the inside rear portion of the operator's window to prevent drafts from entering through the open window when the vehicle is propelled forwardly; which, at the same time, will not interfere with the operator giving hand signals through the open window when he so desires; is movably mounted in the operator's window so that an opening can be provided to allow for increased ventilation when this is desired; is so designed as to provide a pocket for collecting air which may enter the open window and deflect the air in such manner as to create an aspirator or suction effect for continually withdrawing air from inside of the vehicle, thus maintaining air conditions in the vehicle pure, and at the same time, preventing ingress of rain if it is raining; is of simple and economical construction; which can be very readily installed as an accessory or auxiliary piece of equipment if not originally installed on the automobile at the factory; and which will not interfere with opening or closing of the window panel adjacent thereto or with the operation of the customary door latching or locking means on the door on which it is mounted.

Referring to the drawings:

Fig. 3 is an isometric view illustrating one form of deflector of my invention, in its preferred embodiment;

Fig. 4 is a vertical sectional elevation looking in the direction of arrow 4 in Fig. 1;

Fig. 5 is an enlarged fragmentary horizontal sectional view similar to the section of Fig. 2, illustrating the construction of my invention, and depicting in phantom lines an adjusted position of the deflector;

Fig. 6 is a schematic horizontal sectional elevation illustrating my deflector in an open ventilating position, and the air flow current created thereby in such position;

Fig. 7 is a fragmentary side elevation of another form of closed body automobile, in which the deflector is of a slightly different configuration or contour to conform to the shape of the rear portion of the window of such type of body; and Fig. 8 is an isometric view on a reduced scale of the deflector for the shape of window illustrated in Fig. 7.

Figure 1:
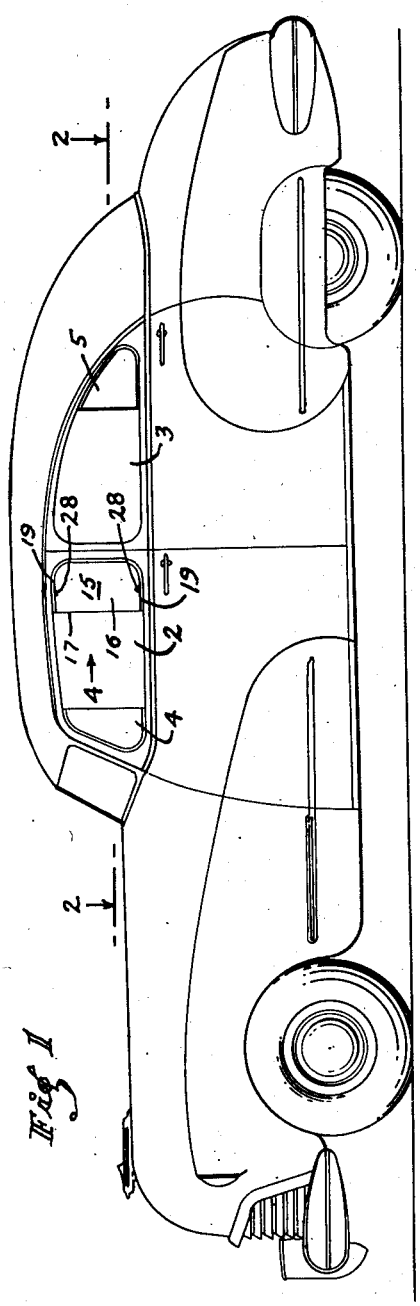
Fig. 1 is a more or less schematic side elevation of an automobile of the four door sedan type, illustrating the deflector of my invention mounted at the inside of the operator's window adjacent the rear thereof.
Figure 2:
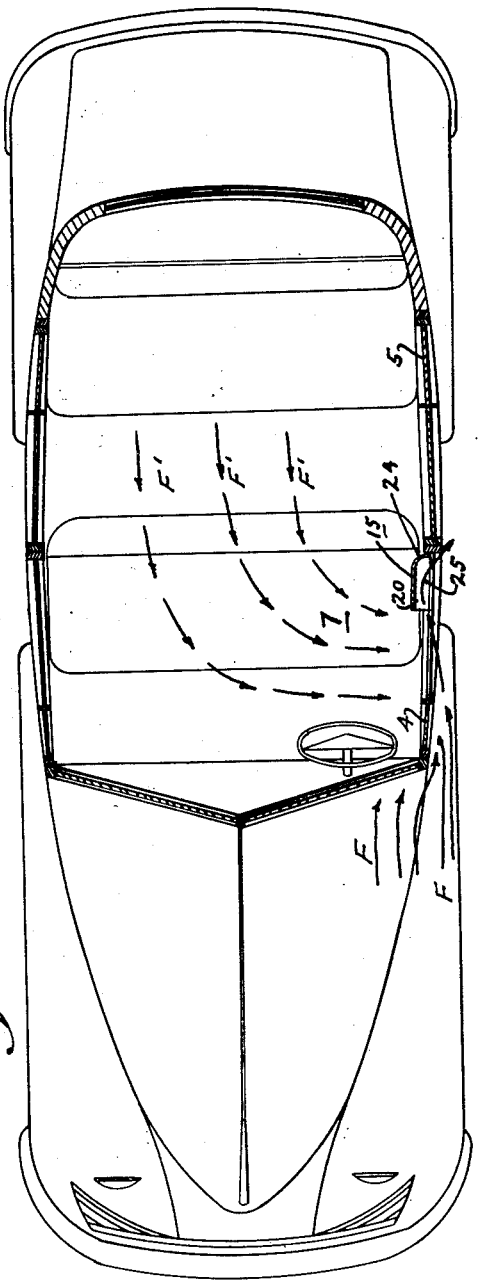
Fig. 2 is a horizontal section taken in the plane indicated by line 2—2 of Fig. 1.

With reference to Figs. 1 and 2, the usual four door type of sedan body has front operator's window 2 and rear window 3 in the respective doors at each side thereof. Usually, pivoted draft panel 4 is provided at the front of the front window pane, and a similar deflector 5 at the rear of the rear window pane. With respect to the operator's window 2 at operator's station 7 of the vehicle, at which window the deflector of my invention has particular applicability, such window comprises the usual transparent window pane 8 vertically slidable in guideways 9 of window frame 11. Window pane 8 is positioned between pivoted draft panel 4 and the rear portion of the window frame. The construction thus far described is more or less conventional in all closed body type of automobiles.

As can be noted more particularly from Figs. 1, 2, 4 and 5, the deflector 15 of my invention is positioned at the rear portion only of window 2 and entirely inside of and closely adjacent the plane of window pane 8. It need only extend from the rear end of the window about one-third the effective length of the window opening, as determined by the length of the window pane 8. Consequently, when in position, it does not offer any interference to arm signaling by the operator when the window is open; nor does it interfere with opening or closing of window pane 8 by manipulation of the usual window pane regulator provided on the door, nor with operation of the usual door latching or locking means provided on the door. The deflector is scoop-shaped, and comprises a planar sheet portion 16 of any suitable transparent material, such as glass or any of the well known synthetic plastics.

Extending about the entire periphery of the deflector except at its front edge 17, is an outwardly projecting flange 18 substantially perpendicular to the plane of sheet portion 16 and which thus provides flange portions along the entire top, the entire bottom and the entire rear of the deflector. In the embodiment illustrated, the entire deflector including its flange is integrally molded out of a suitable transparent plastic material of which there are many types on the market. However, it is to be understood that flange 18 or portions thereof need not be integral with sheet portion 16 of the deflector, nor need it be transparent, particularly top and bottom portions thereof. Also, flange 18 or any portions thereof need not be of the same material as sheet portion 16.

Flange 18 is relatively wide, at least at the front of the deflector, for a purpose to be explained more fully hereinafter, and is preferably of substantially constant or uniform width. When the deflector is in position, its front edge 17 is substantially parallel to the plane of window pane 8 all the way between the top and the bottom of the window frame. It is to be noted that the configuration of the planar portion 16 of the deflector and also of the marginal edge 19 of flange 18 are such that when the deflector is in position with the outside surface of marginal edge 19 adjacent and in relatively close fitting relationship with the inside of the rear portion of the window frame, as is illustrated in Figs. 1 and 4, the deflector overlies the entire space between the top and bottom of the window at the rear of the window, and the marginal edge of the flange is substantially congruent with the window frame at the rear. Thus the deflector follows the contour of the rear portion of the window frame.

With the deflector in position, a relatively wide pocket 20 is formed within the flange 18 between sheet portion 16 and the plane of window pane 8, which pocket is open at front edge 17. The width of flange 18 is such as to position forward edge 17 of the deflector considerably inwardly of a line D substantially parallel to the center line of the vehicle and extending from the front window frame guide part 21, around which part 21 air can enter the inside of the vehicle with the window pane 8 open and the front draft panel 4 closed. In modern automobile bodies, the front portions of the sides slant inwardly toward the windshield. Therefore, to insure catching all draft that may enter the open window, I preferably have deflector flange 18 of such width as to space edge 17 thereof just inside the line D' substantially parallel to the center line of the vehicle and extending from the foremost point 22 around which air can enter the open window with front draft panel 4 open.

Under most conditions, it is preferred to have draft panel 4 closed but as this equipment is supplied on almost all automobiles, flange 18 is preferably of the width described, which for present type bodies may vary from about one (1) to three (3) inches, depending on the body contour. It is only necessary that the deflector be long enough, and that flange 18 be wide enough at least adjacent front edge 17 so as to space such edge and sheet portion 16 inwardly of the plane of the window a distance at least sufficient to insure pocketing substantially all draft that may enter the open window in any open position thereof, as the vehicle is propelled forwardly. These factors can be easily determined for any particular body shapes.

As the vehicle is propelled forwardly, air currents created by the moving vehicle, will enter the open window, as illustrated by the direction arrows F in Fig. 2, but will be caught in the pocket 20 of the deflector. Since such pocket exists all the way between the top and the bottom of the window frame at the entire rear of the window, substantially all air entering the window will be caught by the deflector irrespective of how wide the window is open, and be deflected outwardly as indicated by the direction arrows. In this connection, it is to be noted that at least the outer portion 23 of the rear flange portion of the deflector is at substantially a right angle to the center line of the vehicle or the plane of window pane 8, and that the rear corner 24 of the deflector is curved.

This is important because with the deflector in closed position, the resultant outwardly directed air caught by the deflector creates an aspirator or suction effect which continually withdraws air from inside the body of the vehicle out through the open window, as indicated by the direction arrows F' in Fig. 2. Not only does this suction effect maintain the air inside of the automobile free of exhaust fumes, smoke and odors, but it also prevents rain from entering the open window while the car is in motion and should it be raining.

The described functioning of the deflector is that which obtains when the deflector is positioned so that its marginal edge 19 of flange 18 is in substantial sealing engagement all along the portion of the frame of the window adjacent which the deflector lies. To provide for controlled ventilation inside the vehicle, which is particularly desirable in hot weather driving, the deflector is provided with means enabling mounting thereof for swinging or pivotal movement about an upright axis 25 between the front and rear of the deflector; so that an opening 26 of controllable or adjustable width, may be provided between the rear of the deflector and the rear of the window frame, upon inward swinging movement of the rear of the deflector.

For such pivotal mounting, the top and bottom portions of flange 18 of the deflector are provided with any suitable means in the form of apertures 27 through which screws 28 may be passed that are adapted to be secured in the top and bottom moldings of the window frame 11 as is illustrated in Fig. 4. The described means for attaching the deflector is simple but any other suitable means may be employed which will enable the pivotal movement about the described upright axis.

The operator of the vehicle can readily swing the deflector open to any desired extent for controlling the size of opening 26. When this is done, some of the air caught by the deflector will flow through opening 26, and around and closely adjacent the interior surface of the automobile body, as illustrated by the direction arrows F" in Fig. 6, and out through the opening of the window because of the suction effect above described. Thus the interior of the vehicle body may be ventilated with a cool draft of air, and because of the described flow of air along the inside surface of the automobile body, such draft will not strike any of the occupants in their seats.

The rear portions of windows in modern closed type automobile bodies vary somewhat in their configuration or contour. However, this is immaterial insofar as the functioning of my deflector is concerned, because all that need be done is to shape the deflector accordingly so as to provide the relatively wide pocket all the way between the top and bottom of the window at its rear. For example, Figs. 7 and 8 illustrate a so-called coupe type automobile body in which the rear portion of the window is substantially triangularly shaped. Deflector 31 which is provided with flange 32 at its top, bottom and rear, is shaped to conform to the contour or configuration of the rear portion of the window and is pivotally mounted at 33 as already described. This shape of deflector functions in the same manner as that described.

The deflector of my invention may be employed at all the windows of the auotmobile but for the reasons explained, it is of particular applicability for employment in the window adjacent the operator's station of the vehicle. When thus employed, the pivoted draft panel 4 generally incorporated in automobile bodies should usually be maintained closed, although it may be opened to create varied effects; and in some instances, particularly when the draft panel 4 is opened so that its forward edge is outside the vehicle body, my deflector increases the efficacy of such draft panel.

I claim:

1. The combination with an automobile side window having a frame and a slidable window pane which is adapted to be moved for opening or closing the window; of an air deflector mounted at the rear of said window within the automobile adjacent the plane of the window pane; said deflector comprising a transparent sheet portion of a configuration adapted to overlie the entire space between the top and bottom of the window at its rear and having an outwardly extending flange along its top, bottom and rear, the marginal edge of said flange being substantially congruent with the configuration of the rear portion of the window frame whereby when the deflector is positioned with said marginal edge adjacent said rear portion of the window frame, a pocket is provided within said flange to catch air entering the open window and deflect said air outwardly; and means mounting said deflector for pivotal movement about an upright axis and for inward movement of the rear of the deflector, so that an opening may be provided between the rear thereof and the rear of the window frame.

2. The combination with an automobile side window having a frame and a slidable window pane which is adapted to be moved for opening or closing the window; of an air deflector mounted at the rear of said window within the automobile adjacent the plane of the window pane; said deflector comprising a transparent sheet portion of a configuration adapted to overlie the entire space between the top and bottom of the window at its rear and having an outwardly extending flange along its top, bottom and rear, the marginal edge of said flange being substantially congruent with the configuration of the rear portion of the window frame whereby when the deflector is positioned with said marginal edge adjacent said rear portion of the window frame, a pocket is provided within the flange to catch air entering the open window and deflect said air outwardly, the front edge of the sheet portion being unflanged and substantially parallel to the plane of the window substantially the entire distance between the top and bottom of the window frame, and at least the outer portion of the rear part of the flange of the deflector being at substantially a right angle to the plane of the window whereby when the window is open, air entering the window will be deflected outwardly by said rear part of the flange and create an aspirator effect for withdrawing air from within the automobile through the open window; and means mounting said deflector for pivotal movement about an upright axis and for inward movement of the rear of the deflector so that an opening may be provided between the rear thereof and the rear of the window frame.

3. The combination with an automobile side window having a frame and a slidable window pane which is adapted to be moved for opening or closing the window; of an air deflector mounted at the rear of said window within the automobile adjacent the plane of the window pane; said deflector comprising a transparent sheet portion of a configuration adapted to overlie the entire space between the top and bottom of the window at its rear and having an outwardly extending flange along its top, bottom and rear, the marginal edge of said flange being substantially congruent with the configuration of the rear portion of the window frame whereby when the deflector is positioned with said marginal edge adjacent said rear portion of the window frame, a pocket is provided within the flange to catch air entering the open window and deflect said air outwardly, the front edge of the sheet portion being unflanged and substantially parallel to the plane of the window substantially the entire distance between the top and bottom of the window frame, and at least the outer portion of the rear part of the flange of the deflector being at substantially a right angle to the plane of the window whereby when the window is open, air entering the window will be deflected outwardly by said rear part of the flange and create an aspirator effect for withdrawing air from within the automobile through the open window; and means mounting said deflector intermediate its front and rear for pivotal movement about an upright axis, so that the rear of the deflector may be moved inwardly to provide an opening between the rear thereof and the rear of the window frame for ventilating purposes.

4. The combination with an automobile side window having a frame and a slidable window pane which is adapted to be moved for opening or closing the window; of an air deflector mounted at the rear of said window within the automobile adjacent the plane of the window pane so as not to interfere with opening or closing of the window; said deflector covering an entire rear surface area of the window between the top and bottom thereof and being provided with an outwardly extending flange along its entire periphery except at the front edge, the marginal edge of said flange being congruent with the inside of the window frame at its rear whereby an air deflecting pocket of substantial depth is formed substantially over the entire surface area of said deflector to catch air entering the open window and deflect it outwardly at the rear of the deflector; and said deflector being pivoted to said frame intermediate its front and rear for swinging movement about an upright axis to provide for inward movement of the rear of such deflector and the formation of a controllable opening between said rear and the rear of the window frame for ventilating purposes.

CHESTER H. GILLIG.

REFERENCES CITED

The following references are of record in the file of this patent:

UNITED STATES PATENTS

| Number | Name | Date |
|---|---|---|
| 1,962,966 | Morrison | June 12, 1934 |
| 2,152,538 | Dalton | Mar. 28, 1939 |
| 2,242,606 | Duncan | May 20, 1941 |
| 2,281,840 | Hamilton | May 5, 1942 |